United States Patent
Kamatani et al.

(10) Patent No.: US 10,246,079 B2
(45) Date of Patent: Apr. 2, 2019

(54) HYBRID VEHICLE

(71) Applicant: TOYOTA JIDOSHA KABUSHIKI KAISHA, Toyota-shi, Aichi-ken (JP)

(72) Inventors: Hideki Kamatani, Toyota (JP); Koji Hokoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/823,859

(22) Filed: Nov. 28, 2017

(65) Prior Publication Data

US 2018/0148040 A1 May 31, 2018

(30) Foreign Application Priority Data

Nov. 29, 2016 (JP) .................. 2016-231420

(51) Int. Cl.

| B60W 20/00 | (2016.01) |
|---|---|
| B60W 20/16 | (2016.01) |
| B60W 10/184 | (2012.01) |
| B60W 30/182 | (2012.01) |
| F02D 7/00 | (2006.01) |
| B60W 10/30 | (2006.01) |
| F02D 41/02 | (2006.01) |

(Continued)

(52) U.S. Cl.
CPC .......... *B60W 20/16* (2016.01); *B60W 10/184* (2013.01); *B60W 10/30* (2013.01); *B60W 30/182* (2013.01); *F02D 7/00* (2013.01); *F02D 41/0235* (2013.01); *F02D 41/123* (2013.01); *B60W 2050/0001* (2013.01); *F02D 2200/021* (2013.01); *F02D 2200/0802* (2013.01)

(58) Field of Classification Search
CPC ...... B60W 20/16; B60W 10/08; B60W 10/06; B60W 10/184; B60W 10/30; B60W 30/182; B60W 20/13; B60W 20/10
See application file for complete search history.

(56) References Cited

U.S. PATENT DOCUMENTS

| 5,934,396 A | 8/1999 | Kurita | |
|---|---|---|---|
| 2001/0039230 A1* | 11/2001 | Severinsky | ........... B60W 10/06 477/3 |
| 2009/0159351 A1 | 6/2009 | Ando et al. | |

(Continued)

FOREIGN PATENT DOCUMENTS

| JP | H09-158961 A | 6/1997 |
|---|---|---|
| JP | 2007-161209 | 6/2007 |

(Continued)

*Primary Examiner* — Hau V Phan
(74) *Attorney, Agent, or Firm* — Finnegan, Henderson, Farabow, Garrett & Dunner, LLP

(57) ABSTRACT

A hybrid vehicle comprises an engine configured to output power for driving and equipped with an exhaust emission control device in an exhaust system thereof. The hybrid vehicle further comprises a control device. In response to a predetermined rotation request for rotating the engine with no need to output power from the engine, the control device performs a control to rotate the engine with fuel injection when a catalyst temperature in the exhaust emission control device is equal to or higher than a predetermined temperature, while performing a control to rotate the engine without the fuel injection when the catalyst temperature is lower than the predetermined temperature.

5 Claims, 4 Drawing Sheets

(51) Int. Cl.
*F02D 41/12* (2006.01)
*B60W 50/00* (2006.01)

(56) References Cited

U.S. PATENT DOCUMENTS

| | | | |
|---|---|---|---|
| 2010/0049389 A1* | 2/2010 | Ando | B60W 10/08 |
| | | | 701/22 |
| 2014/0020363 A1* | 1/2014 | Sasaki | F01N 3/10 |
| | | | 60/274 |
| 2014/0309832 A1* | 10/2014 | Ando | B60W 10/06 |
| | | | 701/22 |
| 2014/0336904 A1 | 11/2014 | Nakanishi et al. | |
| 2014/0365056 A1* | 12/2014 | Ando | B60W 10/06 |
| | | | 701/22 |
| 2015/0298687 A1* | 10/2015 | Kanno | B60W 10/06 |
| | | | 701/22 |
| 2015/0298688 A1* | 10/2015 | Teraya | B60W 10/26 |
| | | | 701/22 |
| 2016/0114788 A1* | 4/2016 | Kamatani | B60W 20/10 |
| | | | 701/22 |
| 2016/0114791 A1* | 4/2016 | Muta | B60W 10/06 |
| | | | 701/22 |
| 2016/0160775 A1* | 6/2016 | Endo | B60W 10/08 |
| | | | 123/2 |
| 2016/0362099 A1* | 12/2016 | Obata | B60W 20/13 |

FOREIGN PATENT DOCUMENTS

| | | |
|---|---|---|
| JP | 2007-186111 | 7/2007 |
| JP | 2010-195157 A | 9/2010 |
| JP | 2011-031674 A | 2/2011 |
| WO | WO 2013/061454 A1 | 5/2013 |

* cited by examiner

HYBRID VEHICLE

This application claims priority to Japanese Patent Application No. 2016-231420 filed 29 Nov. 2016, the contents of which is incorporated herein by reference.

TECHNICAL FIELD

The present disclosure relates to a hybrid vehicle and more specifically relates to a hybrid vehicle equipped with an engine configured to output power for driving and a motor configured to motor the engine.

BACKGROUND

In a hybrid vehicle equipped with an engine and two motors that are connected with a planetary gear, a proposed configuration determines whether the fuel supply is to be cut or not according to the condition of a battery in response to a deceleration request in an accelerator-off state (as described in, for example, JP 2007-186111A). When a state of charge SOC of the battery is lower than a predetermined level, the hybrid vehicle of this proposed configuration still has a margin to charge the battery and accordingly performs a control without cutting the fuel supply to cause a torque for braking to be output from the engine and the two motors. This suppresses deterioration of the conversion performance of a catalyst in a exhaust emission control device mounted to an exhaust system of the engine, due to supplying oxygen to the catalyst. When the state of charge SOC of the battery is equal to or higher than the predetermined level, on the other hand, the hybrid vehicle of this proposed configuration does not have the margin to charge the battery and accordingly performs a control with cutting the fuel supply to cause the torque for braking to be output from the engine and the two motors. This control reduces the charging power of the battery, while outputting the torque for braking.

CITATION LIST

Patent Literature

PTL 1: JP 2007-186111A

SUMMARY

The hybrid vehicle described above performs the control with cutting the fuel supply to cause the torque for braking to be output from the engine and the two motors, when the state of charge SOC of the battery is equal to or higher than the predetermined level. This causes accumulation of oxygen in the catalyst and deterioration of the conversion performance of the catalyst. This problem is not characteristic of the deceleration request in the accelerator-off state but is commonly found in the case of motoring the engine accompanied with cutting the fuel supply.

A hybrid vehicle of the present disclosure mainly aims to suppress deterioration of the conversion performance of an exhaust emission control device.

In order to achieve the above main object, the hybrid vehicle of the present disclosure may be implemented by the following aspects.

According to one aspect of the present disclosure, there is provided a hybrid vehicle including: an engine configured to output power for driving and equipped with an exhaust emission control device in an exhaust system thereof; a first motor configured to motor the engine; a second motor configured to output power for driving; a power storage device configured to transmit electric power to and from the first motor and the second motor; and a control device configured to control the engine, the first motor and the second motor, wherein in response to a predetermined rotation request for rotating the engine with no need to output power from the engine, when a catalyst temperature in the exhaust emission control device is equal to or higher than a predetermined temperature, the control device performs a first control that controls the engine and the first motor to rotate the engine with fuel injection, and when the catalyst temperature is lower than the predetermined temperature, the control device performs a second control that controls the engine and the first motor to rotate the engine without the fuel injection.

In response to the predetermined rotation request for rotating the engine with no need to output power from the engine, when the catalyst temperature in the exhaust emission control device is equal to or higher than the predetermined temperature, the hybrid vehicle of this aspect performs the first control that controls the engine and the first motor to rotate the engine with fuel injection. The predetermined temperature may be an activation temperature of the catalyst or a slightly lower temperature than the activation temperature. This suppresses accumulation of oxygen in the catalyst and deterioration of the conversion performance of the catalyst. In response to the predetermined rotation request, when the catalyst temperature in the exhaust emission control device is lower than the predetermined temperature, on the other hand, the hybrid vehicle of this aspect performs the second control that controls the engine and the first motor to rotate the engine without the fuel injection. The temperature of the catalyst is lower than the activation temperature, so that even supplying oxygen to the catalyst with cutting the fuel supply is unlikely to cause oxygen to be accumulated in the catalyst. This accordingly suppresses accumulation of oxygen in the catalyst and deterioration of the conversion performance of the catalyst. The predetermined rotation request may include, for example, a request for rotating the engine to apply engine braking and a request for rotating the engine to drive a mechanical pump that is driven by rotation of an output shaft of the engine.

DESCRIPTION OF EMBODIMENTS

The following describes some aspects of the present disclosure with reference to embodiments.

Figure 1:
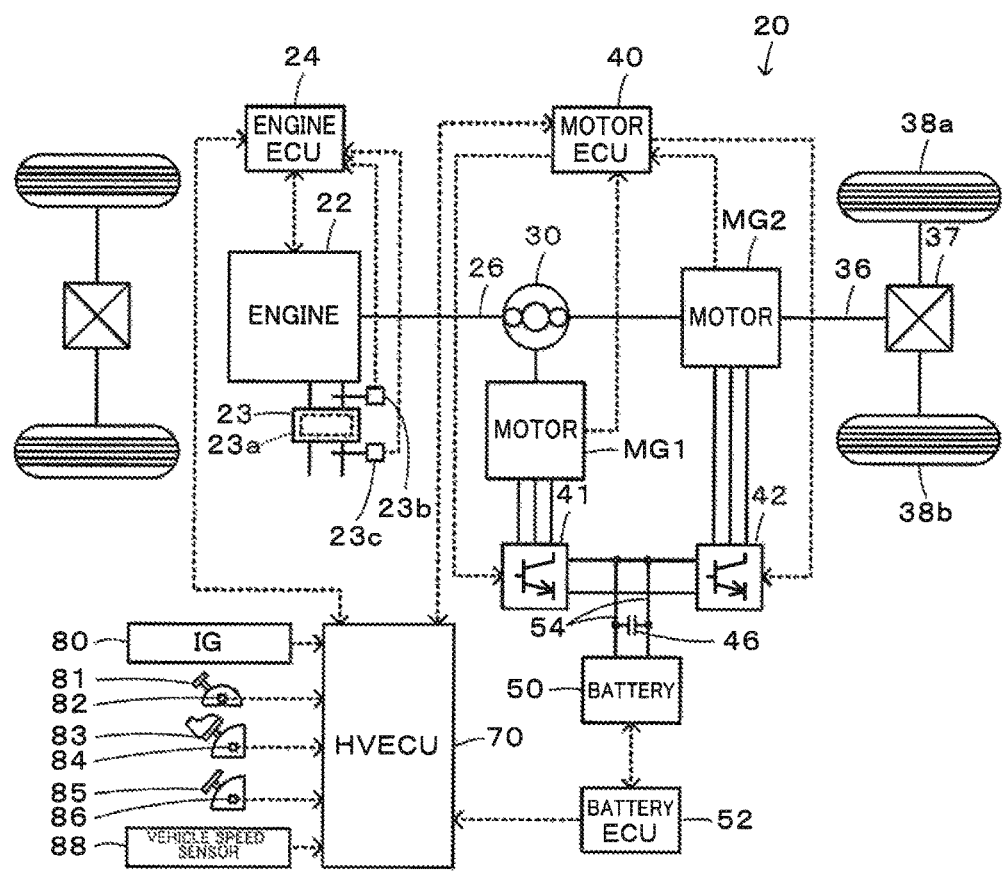
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a battery 50 and a hybrid electronic control unit (hereinafter referred to as HVECU) 70.

The engine 22 is configured as an internal combustion engine to output power using, for example, gasoline or light oil as a fuel. This engine 22 is subjected to operation control by an engine electronic control unit (hereinafter referred to as engine ECU) 24. An exhaust emission control device 23 is provided in an exhaust system of the engine 22. The exhaust emission control device 23 is filled with a catalyst 23a for removal of uncombusted fuel and nitrogen oxides included in the exhaust emission.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals from the various sensors include, for example, a crank angle $\theta cr$ from a crank position sensor (not shown) configured to detect the rotational position of a crankshaft 26 and a cooling water temperature Tw from a water temperature sensor (not shown) configured to detect the temperature of cooling water of the engine 22. The signals from the various sensors also include a throttle position TH from a throttle position sensor (not shown) configured to detect the position of a throttle valve, an intake air flow Qa from an air flowmeter (not shown) mounted to an air intake pipe, and an intake air temperature Ta from a temperature sensor (not shown) mounted to the air intake pipe. The signals from the various sensors further include an air/fuel ratio AF from an air/fuel ratio sensor 23b mounted on an upstream side of the exhaust emission control device 23 in the exhaust system, and an oxygen signal O2 from an oxygen sensor 23c mounted on a downstream side of the exhaust emission control device 23. Various control signals for operation control of the engine 22 are output from the engine ECU 24 via the output port. The various control signals include, for example, a driving signal to a fuel injection valve, a driving signal to a throttle motor configured to regulate the position of the throttle valve, and a control signal to an ignition coil integrated with an igniter. The engine ECU 24 is connected with the HVECU 70 via the respective communication ports. This engine ECU 24 controls the operations of the engine 22, in response to control signals from the HVECU 70. The engine ECU 24 also outputs data regarding the operating conditions of the engine 22 to the HVECU 70 as needed basis. The engine ECU 24 calculates a rotation speed of the crankshaft 26, i.e., a rotation speed Ne of the engine 22, based on the detected crank angle $\theta cr$. The engine ECU 24 also estimates a temperature Tc of the catalyst 23a (catalyst temperature Tc) in the exhaust emission control device 23, based on the detected cooling water temperature Tw.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 38a and 38b via a differential gear 37. The planetary gear 30 further includes a carrier that is connected with the crankshaft 26 of the engine 22.

The motor MG1 is configured as a known synchronous generator motor including a rotor with permanent magnets embedded therein and a stator with three-phase coils wound thereon, and this rotor is connected with the sun gear of the planetary gear 30 as described above. The motor MG2 is also configured as a synchronous generator motor like the motor MG1 and includes a rotor that is connected with the driveshaft 36. A motor electronic control unit (hereinafter referred to as motor ECU) 40 controls the inverters 41 and 42, so as to drive the motors MG1 and MG2. The inverters 41 and 42 are connected with power lines 54 which the battery 50 is connected with. Each of the inverters 41 and 42 is configured as a known inverter that is comprised of six transistors and six diodes. The inverters 41 and 42 are arranged to share the power lines 54 and enable electric power generated by one of the motors MG1 and MG2 to be supplied to the other motor.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2 are input into the motor ECU 40 via the input port. The signals input from the various sensors include, for example, rotational positions $\theta m1$ and $\theta m2$ from rotational position detection sensors (not shown) configured to detect the rotational positions of the respective rotors of the motors MG1 and MG2, phase currents from current sensors (not shown) configured to detect electric currents flowing in the respective phases of the motors MG1 and MG2, and a voltage VL of a capacitor 46 (power lines 54) from a voltage sensor (not shown) mounted between terminals of the capacitor 46. The motor ECU 40 outputs via the output port, for example, switching control signals to the transistors of the respective inverters 41 and 42 to control driving of the motors MG1 and MG2. The motor ECU 40 is connected with the HVECU 70 via the respective communication ports. This motor ECU 40 controls driving of the motors MG1 and MG2, in response to control signals from the HVECU 70. The motor ECU 40 also outputs data regarding the driving conditions of the motors MG1 and MG2 to the HVECU 70 as needed basis. The motor ECU 40 calculates rotation speeds Nm1 and Nm2 of the motors MG1 and MG2, based on the rotational positions $\theta m1$ and $\theta m2$ of the respective rotors of the motors MG1 and MG2.

The battery 50 is configured as, for example, a lithium ion rechargeable battery or a nickel metal hydride battery and serves to transmit electric power to and from the motors MG1 and MG2 via the inverters 41 and 42. The battery 50 is under management of a battery electronic control unit (hereinafter referred to as battery ECU) 52.

The battery ECU 52 is configured as a CPU-based microprocessor and includes a ROM configured to store processing programs, a RAM configured to temporarily store data, input/output ports and a communication port, in addition to the CPU, although not being illustrated. Signals required for management of the battery 50 are input into the battery ECU 52 via the input port, and data regarding the conditions of the battery 50 are sent from the battery ECU 52 to the HVECU 70 by communication as needed basis. The signals input via the input port include, for example, an inter-terminal voltage Vb from a voltage sensor (not shown) placed between terminals of the battery 50, a charge-discharge current Ib from a current sensor (not shown) mounted to the power lines 54 connected with an output terminal of the battery 50, and a battery temperature Tb from a temperature sensor (not shown) mounted to the battery 50. The battery ECU 52 calculates a state of charge SOC and input and output limits Win and Wout for management of the battery 50. The state of charge SOC denotes a ratio of the capacity of electric power dischargeable from the battery 50 to the overall capacity of the battery 50, and is calculated based on an integrated value of the charge-discharge current Ib detected by the current sensor. The input and output limits Win and Wout denote maximum allowable electric powers chargeable into and dischargeable from the battery 50, and are calculated based on the calculated state of charge SOC and the battery temperature Tb.

The HVECU 70 is configured as a CPU-based microprocessor and includes a ROM configured to store processing programs, a RAM configured to temporarily store data, input/output ports and a communication port, in addition to the CPU, although not being illustrated. Signals input from various sensors are input into the HVECU 70 via the input port. The signals from the various sensors include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 40 and the battery ECU 52 via the respective communication ports as described above. This HVECU 70 transmits various control signals and data to and from the engine ECU 24, the motor ECU 40 and the battery ECU 52.

The hybrid vehicle 20 of the embodiment having the above configuration may be driven in a hybrid drive mode (HV drive) with operation of the engine 22 or in an electric drive mode (EV drive) without operation of the engine 22.

Figure 2:
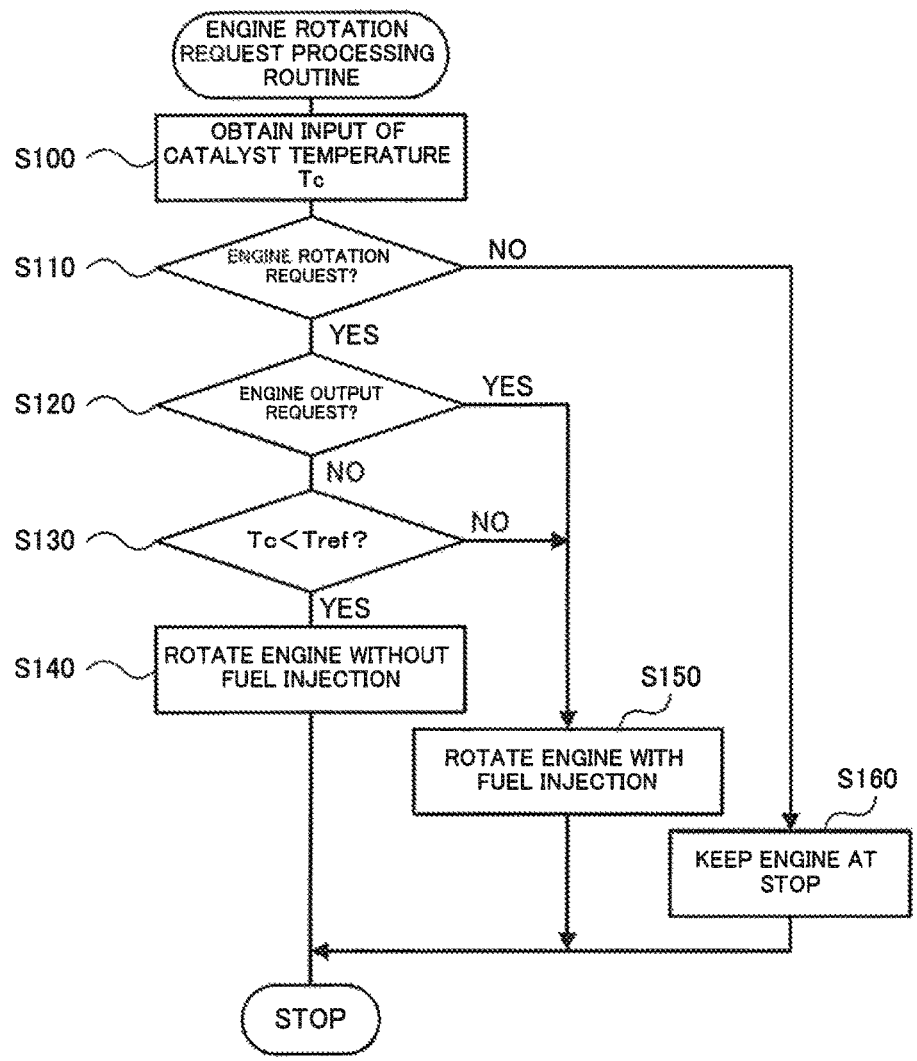
FIG. 2 is a flowchart showing one example of engine rotation request processing routine performed by an HVECU.

The following describes operations of the hybrid vehicle 20 of the embodiment having the above configuration and more specifically series of operations when there is a request for rotating the engine 22 with no need to output power from the engine 22 during a drive in the EV drive mode. FIG. 2 is a flowchart showing one example of engine rotation request processing routine performed by the HVECU 70. This routine is performed repeatedly at predetermined time intervals in the EV drive mode.

When the engine rotation request processing routine is triggered, the HVECU 70 first obtains input of a catalyst temperature Tc (step S100). According to this embodiment, the catalyst temperature Tc is estimated based on the cooling water temperature Tw from the water temperature sensor (not shown) configured to detect the temperature of cooling water of the engine 22 and is input from the engine ECU 24 by communication. The HVECU 70 subsequently determines whether there is a request for rotating the engine 22 (step S110). The request for rotating the engine 22 may be, for example, a request for starting the engine 22 with a need to output power for driving from the engine 22, a request for starting the engine 22 to charge the battery 50 with power from the engine 22, a request for rotating the engine 22 to apply engine braking, a request for rotating the engine 22 to drive a mechanical pump (not shown) that is driven by rotation of the crankshaft 26 of the engine 22, or a request for rotating the engine 22 to protect a component. When there is no request for rotating the engine 22, the HVECU 70 keeps the engine 22 at stop (step S160) and then terminates this routine.

Figure 3:
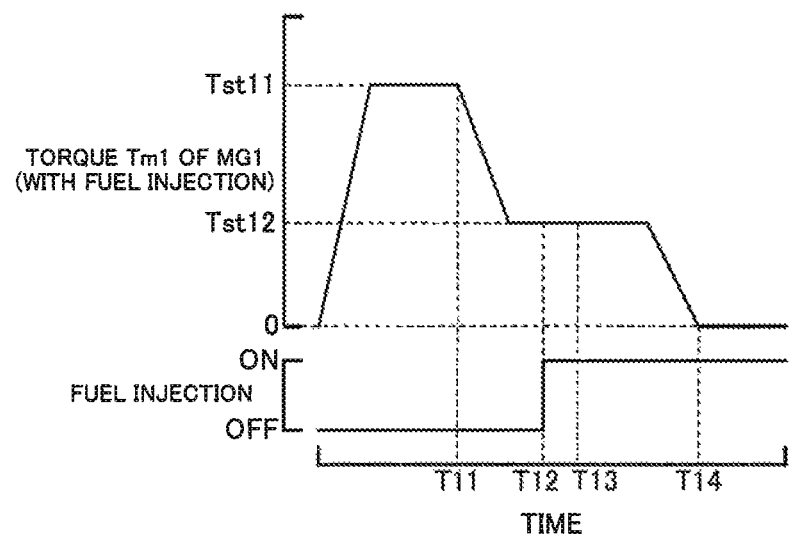
FIG. 3 is a diagram illustrating one example of time changes in torque Tm1 of a motor MG1 and in the state of fuel injection when an engine is rotated with fuel injection.

When there is a request for rotating the engine 22, on the other hand, the HVECU 70 subsequently determines that the request for rotating the engine 22 is based on a request for outputting power from the engine 22 (step S120). The request for rotating the engine 22 that is based on the request for outputting power from the engine 22 may be, for example, based on a request for outputting power for driving from the engine 22 or based on a request for charging the battery 50 with power from the engine 22. The request for rotating the engine 22 that is not based on the request for outputting power from the engine 22 may be, on the other hand, for example, based on a request for applying engine braking, based on a request for driving the mechanical pump or based on a request for protecting a component. When it is determined that the request for rotating the engine 22 is based on a request for outputting power from the engine 22, the HVECU 70 rotates the engine 22 with fuel injection (step S150) and then terminates this routine. One example of time changes in torque Tm1 of the motor MG1 and in the state of fuel injection in this case is illustrated in FIG. 3. According to this embodiment, the torque Tm1 output from the motor MG1 increases to a relatively large torque Tst11 on start of rotation of the engine 22 to cause the rotation speed Ne of the engine 22 to quickly pass through a resonance frequency range, starts decreasing to a torque Tst12 required for causing the rotation speed Ne of the engine 22 to reach a predetermined rotation speed at a time T11 after the rotation speed Ne of the engine 22 quickly passes through the resonance frequency range, and further decreases to zero at a time T14 when the rotation speed Ne of the engine 22 reaches the predetermined rotation speed. The fuel injection is started at a time T12 when the rotation speed Ne of the engine 22 reaches a rotation speed that starts the fuel injection, and causes a first explosive combustion (initial explosive combustion) at a time T13. After a time T14, the engine 22 is controlled to have self-sustaining operation at a rotation speed corresponding to a request.

When it is determined at step S120 that the request for rotating the engine 22 is not based on a request for outputting power from the engine 22, on the other hand, the HVECU 70 compares the catalyst temperature Tc with a reference value Tref (step S130). The reference value Tref herein is determined in advance to be a lower limit temperature at which the catalyst 23*a* is activated or a slightly lower temperature than the lower limit temperature. When it is determined that the catalyst temperature Tc is equal to or higher than the reference temperature Tref, it is determined that the catalyst 23*a* is activated and that supplying the air to the exhaust emission control device 23 is likely to cause accumulation of oxygen in the catalyst 23*a* and deterioration of the conversion performance of the catalyst 23*a*. The HVECU 70 accordingly rotates the engine 22 with the fuel injection (step S150) and then terminates this routine. In this case, the fuel injection is controlled to basically provide a stoichiometric air-fuel ratio. This suppresses oxygen from being supplied to the exhaust emission control device 23 and thereby suppresses accumulation of oxygen in the catalyst 23*a*.

Figure 4:
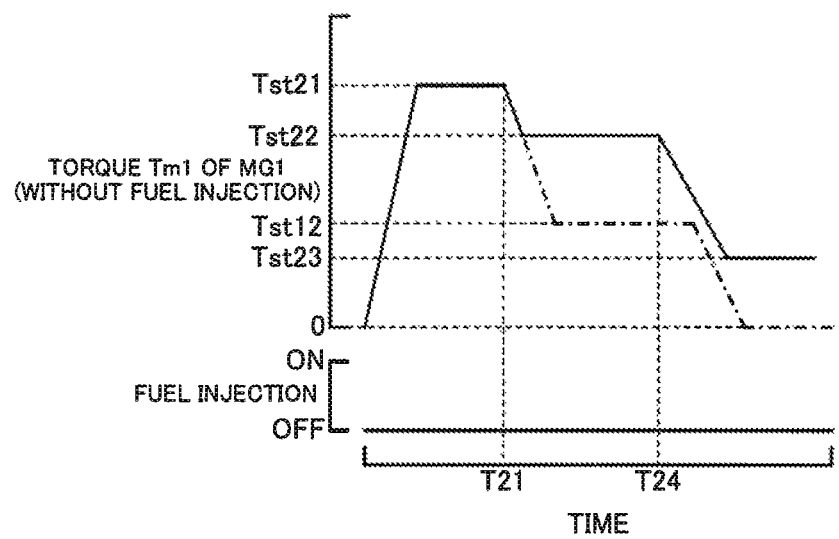
FIG. 4 is a diagram illustrating one example of time changes in torque Tm1 of the motor MG1 and in the state of fuel injection when the engine is rotated without fuel injection.

When it is determined at step S120 that the catalyst temperature Tc is lower than the reference value Tref, on the other hand, it is determined that the catalyst 23*a* is not activated and that supplying the air to the exhaust emission control device 23 is unlikely to cause accumulation of oxygen in the catalyst 23*a*. The HVECU 70 accordingly rotates the engine 22 without the fuel injection (accompanied with cutting the fuel supply) (step S140) and then terminates this routine. One example of time changes in the torque Tm1 of the motor MG1 and in the state of fuel injection in this case is illustrated in FIG. 4. A one-dot chain line graph indicates the time change in the torque Tm1 with the fuel injection. According to this embodiment, as in the time change of the torque Tm1 with the fuel injection, the torque Tm1 output from the motor MG1 increases to a relatively large torque Tst21 (Tst21=Tst11) on start of rotation of the engine 22 to cause the rotation speed Ne of the engine 22 to quickly pass through the resonance frequency range, and starts decreasing to a torque Tst22 required for causing the rotation speed Ne of the engine 22 to reach a rotation speed corresponding to a request at a time T21 after the rotation speed Ne of the engine 22 quickly passes through the resonance frequency range. This torque Tst22 is larger than the torque Tst12 in the time change of the torque Tm1 with the fuel injection. This aims to cause the rotation speed Ne of the engine 22 to quickly reach the rotation speed corresponding to the request. The torque Tm1 then starts further decreasing to a torque Tst23 that is required for keeping the rotation speed Ne of the engine 22 at a predetermined rotation speed at a time T24 when the rotation speed Ne of the engine 22 reaches the predetermined rotation speed. In this case, the fuel injection is not performed at all. After the time T24, the torque Tm1 of the motor MG1 is controlled to cause the rotation speed Ne of the engine 22 to reach the rotation speed corresponding to the request. The catalyst temperature Tc is lower than the reference value Tref, so that the catalyst 23a is not activated and oxygen is unlikely to be accumulated in the catalyst 23a. As a result, even supplying oxygen with cutting the fuel supply suppresses accumulation of oxygen in the catalyst 23a and deterioration of the conversion performance of the catalyst 23a.

As described above, in response to a request for rotating the engine 22 with no need to output power from the engine 22, when the temperature Tc of the catalyst 23a in the exhaust emission control device 23 is equal to or higher than the reference value Tref, the hybrid vehicle 20 of the embodiment performs the control to rotate the engine 22 with the fuel injection. The fuel injection is controlled to basically provide the stoichiometric air-fuel ratio. This suppresses oxygen from being supplied to the exhaust emission control device 23 and thereby suppresses oxygen from being accumulated in the catalyst 23a. As a result, this suppresses accumulation of oxygen in the catalyst 23a and deterioration of the conversion performance of the catalyst 23a. In response to a request for rotating the engine 22 with no need to output power from the engine 22, when the temperature Tc of the catalyst 23a in the exhaust emission control device 23 is lower than the reference value Tref, on the other hand, the hybrid vehicle 20 of the embodiment performs the control to rotate the engine 22 without the fuel injection (accompanied with cutting the fuel supply). The catalyst 23a is not activated, so that oxygen is unlikely to be accumulated in the catalyst 23a. Even supplying oxygen with cutting the fuel supply accordingly suppresses oxygen from being accumulated in the catalyst 23a. As a result, this configuration suppresses accumulation of oxygen in the catalyst 23a and deterioration of the conversion performance of the catalyst 23a.

The hybrid vehicle 20 of the embodiment uses the temperature Tc of the catalyst 23a (catalyst temperature Tc) in the exhaust emission control device 23 that is estimated based on the cooling water temperature Tw of the engine 22. A modification may use the catalyst temperature Tc input from a temperature sensor (not shown) configured to directly detect the temperature Tc of the catalyst 23a in the exhaust emission control device 23.

Figure 5:
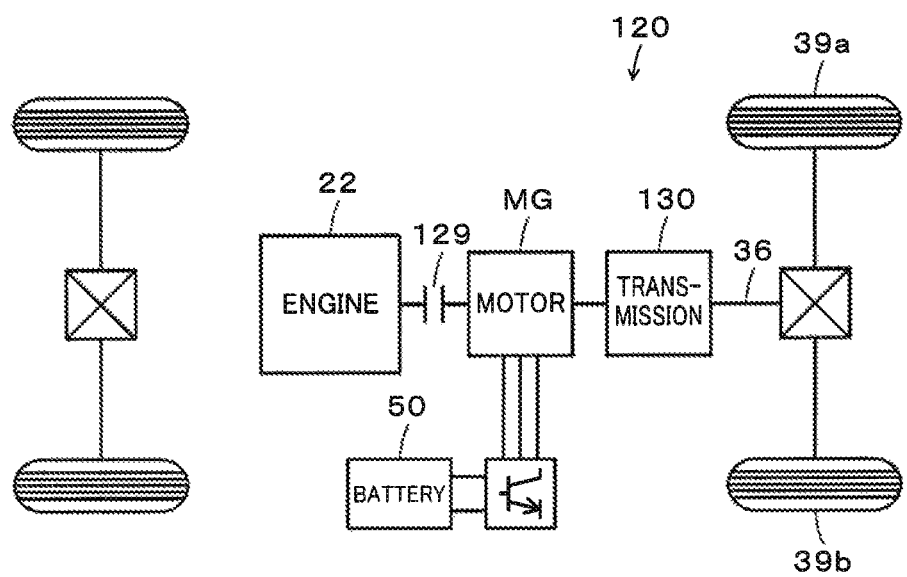
FIG. 5 is a configuration diagram illustrating the schematic configuration of a hybrid vehicle according to a modification.

The hybrid vehicle 20 of the embodiment is configured such that the engine 22 and the motor MG1 are connected via the planetary gear 30 with the driveshaft 36 that is coupled with the drive wheels 38a and 38b and that the motor MG2 is connected with the driveshaft 36. As shown in FIG. 5, a hybrid vehicle 120 of a modification may be configured such that a motor MG is connected via a transmission 130 with a driveshaft 36 that is linked with drive wheels 38a and 38b and that an engine 22 is connected via a clutch 129 with a rotating shaft of the motor MG. The power storage device used is the battery 50 according to the above embodiment but may be any device that enables electric power to be stored, such as a capacitor.

In the hybrid vehicle of the present disclosure, the control device may cause the engine to be motored using a larger torque in the second control, compared with a torque used in the first control.

In the hybrid vehicle of the present disclosure, the catalyst temperature may be either a detected value from a temperature sensor mounted to the exhaust emission control device or an estimated value that is estimated from a cooling water temperature of the engine.

The following describes the correspondence relationship between the primary elements of the above embodiment and the primary elements of the disclosure described in Summary. The exhaust emission control device 23 of the embodiment corresponds to the "exhaust emission control device", the engine 22 corresponds to the "engine". The motor MG1 corresponds to the "first motor", the motor MG2 corresponds to the "second motor", and the battery 50 corresponds to the "power storage device". The HVECU 70, the engine ECU 24 and the motor ECU 40 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The present disclosure is applicable to, for example, the manufacturing industries of hybrid vehicles.

The invention claimed is:
1. A hybrid vehicle, comprising:
an engine configured to output power for driving and equipped with an exhaust emission control device in an exhaust system thereof;
a first motor configured to motor the engine;
a second motor configured to output power for driving;

a power storage device configured to transmit electric power to and from the first motor and the second motor; and a control device configured to control the engine, the first motor and the second motor, wherein in response to a predetermined rotation request for rotating the engine with no need to output power from the engine, when a catalyst temperature in the exhaust emission control device is equal to or higher than a predetermined temperature, the control device performs a first control that controls the engine and the first motor to rotate the engine with fuel injection, and when the catalyst temperature is lower than the predetermined temperature, the control device performs a second control that controls the engine and the first motor to rotate the engine without the fuel injection.

2. The hybrid vehicle according to claim 1, wherein the predetermined rotation request comprises a request for rotating the engine to apply engine braking.

3. The hybrid vehicle according to claim 1, wherein the predetermined rotation request comprises a request for rotating the engine to drive a mechanical pump that is driven by rotation of an output shaft of the engine.

4. The hybrid vehicle according to claim 1, wherein the control device causes the engine to be motored using a larger torque in the second control, compared with a torque used in the first control.

5. The hybrid vehicle according to claim 1, wherein the catalyst temperature is either a detected value from a temperature sensor mounted to the exhaust emission control device or an estimated value that is estimated from a cooling water temperature of the engine.

* * * * *